United States Patent
Huang et al.

(10) Patent No.: US 9,201,909 B1
(45) Date of Patent: Dec. 1, 2015

(54) DATA VOLUME ATTRIBUTES FOR ENTITY-RELATIONSHIP MODELING OF DATABASES

(71) Applicant: CA, Inc., Islandia, NC (US)

(72) Inventors: Feng Huang, Beijing (CN); Zheng Wang, Beijing (CN); Jinbao Zhu, Beijing (CN); Yunzhen Lin, Beijing (CN); Nannan Cao, Beijing (CN)

(73) Assignee: CA, Inc., New York, NY (US)

(*) Notice: Subject to any disclaimer, the term of this patent is extended or adjusted under 35 U.S.C. 154(b) by 191 days.

(21) Appl. No.: 14/064,769

(22) Filed: Oct. 28, 2013

(51) Int. Cl.
 *G06F 17/30* (2006.01)
(52) U.S. Cl.
 CPC .................... *G06F 17/30292* (2013.01)
(58) Field of Classification Search
 CPC .................. G06F 17/30; G06F 17/00
 USPC .................................. 707/600–899
 See application file for complete search history.

(56) References Cited

U.S. PATENT DOCUMENTS

2007/0143250 A1* 6/2007 Zigon ........................ 707/2

OTHER PUBLICATIONS

Wikipedia, the free encyclopedia, "Entity-relationship model", downloaded Aug. 12, 2013 from http://en.wikipedia.org/w/index.php?title=Entity%E2%80%93relationship_model&printable=yes, 8 pp.
Wikipedia, the free encyclopedia, "Database", downloaded Aug. 20, 2013 from http:/en.wikipedia.org/w/index.php?title=Database&printable=yes, 21 pp.
Wikipedia, the free encyclopedia, "Database design", downloaded Aug. 20, 2013 from http:/en.wikipedia.org/w/index.php?title=Database_design&printable=yes, 3 pp.

* cited by examiner

*Primary Examiner* — Isaac M Woo
(74) *Attorney, Agent, or Firm* — Myers Bigel Sibley & Sajovec, P.A.

(57) ABSTRACT

A database modeling computer system defines a first entity, a second entity and a relationship between them according to an entity-relationship data model for a database. The database modeling computer system associates a first data volume attribute value with the first entity and a second data volume attribute value with the second entity. A database creation system selectively merges the first entity and the second entity into a common table, in response to the first and second data volume attribute values. Related systems, methods and computer program products are described.

30 Claims, 7 Drawing Sheets

DATA VOLUME ATTRIBUTES FOR ENTITY-RELATIONSHIP MODELING OF DATABASES

BACKGROUND

Various embodiments described herein relate to computer systems, methods and program products and, more specifically, to database management computer systems, methods and program products.

DataBase Management Systems (DBMSs) are specially designed software applications that interact with users, other applications and a database itself, to capture and analyze data. More specifically, a DBMS may allow the definition, creation, querying, update and administration of databases. Commercially available DBMSs include MySQL, PostgreSQL, SQLite, Microsoft SQL Server, Microsoft Access, Oracle, SAP, dBASE, FoxPro, IBM DB2, LibreOffice Base and FileMaker Pro.

Database design is a process for producing a database. A DBMS may facilitate database design. Database design may generally include three overall operations: conceptual modeling of the database, logical modeling of the database and physical design of the database. In conceptual modeling, a database modeling computer system, method and/or program product is used to identify relationship dependencies within the data to be stored in the database. In logical modeling, a logical structure of a database may be defined using, for example, keys, domains and/or data types. Once the database is conceptually and logically modeled, the physical design of the database can specify the physical configuration of the database in a storage media. The physical design may be performed by a database creation system. Common DBMSs may include both a database modeling system for the conceptual and/or logical modeling and a database creation system, although these functionalities may also be separately provided by separate systems.

A database may be designed using an Entity-Relationship (ER) model, which is a data model for describing a database in an abstract way. In ER modeling, an entity may be defined as a thing which is recognized as being capable of an independent existence and which can be uniquely identified. In English grammar structure, an entity may be thought of as a "noun". A relationship captures how entities are related to each other. Thus, relationships can be thought of as "verbs", linking two or more nouns. Entities and relationships can both have attributes, which may be thought of as "adjectives" for entities, and "adverbs" for relationships.

BRIEF SUMMARY

Various embodiments described herein can allow a database modeling computer system to associate a data volume attribute value with entities in an entity-relationship data model for the database. The data volume attribute values may then be used by a database creation system to selectively merge multiple entities into a common table, so as to allow for example, reduced input/output operations when querying data from different entities.

More specifically, various embodiments described herein can provide a method that comprises defining, by a database modeling computer system, a first entity, a second entity and a relationship therebetween according to an entity-relationship data model for a database. The method further comprises associating, by the database modeling computer system, a first data volume attribute value with the first entity and a second data volume attribute value with the second entity. In some embodiments, the method further comprises selectively merging, by a database creation system, the first entity and the second entity into a common table, in response to the first and second data volume attribute values.

Various embodiments of selectively merging the first entity and the second entity into a common table in response to the first and second data volume attribute values, may be provided. For example, in some embodiments, the first and second entities are merged into the common table if the first data volume attribute value indicates a large data volume and the second data volume attribute value does not indicate the large data volume. In these embodiments, the data volume attribute may be a flag, the setting of which indicates a large data volume, and the merging comprises the first and second entities into the common table if the first data volume attribute value flag is set and the second data volume attribute value flag is not set. In other embodiments, the data volume attribute value is a selection from a plurality of different data volumes and the merging comprises merging the first and second entities into the common table if the first data volume attribute value corresponds to a larger data volume than the second data volume attribute value. The different data volumes may differ from one another by at least an order of magnitude.

In other embodiments, the selectively merging may further comprise storing the first and second entities in separate tables if neither of the first and second data volume attribute values indicates a large data volume. In still other embodiments, the selectively merging may further comprise storing the first and second entities in separate tables if both the first and second data volume attribute values indicate a large data volume. A new table may also be created for frequently queried data from the first and second entities that were separated into separate tables.

Various embodiments have been described above in connection with first and second entities and a relationship therebetween. However, various embodiments described herein may also be extended to three or more entities. Thus, the database modeling computer system may also define a third entity and a relationship between the second and third entities according to the entity-relationship data model for the database. Moreover, the associating of a data volume attribute value may further include associating, by the database modeling computer system, a third data volume attribute value with the third entity. Finally, the selectively merging into a common table may include selectively merging, by the database creation system, the first entity, the second entity and the third entity into a common table, in response to the first, second and third data volume attribute values.

It will be understood that various embodiments have been described above in connection with methods of associating data volume attribute values with entities and selectively merging entities in a common table in response to the data volume attribute values. However, various other embodiments described herein can provide a computer program, such as a database management system, to associate data volume attribute values with entities and selectively merge entities in a common table in response to the data volume attribute values, according to any of the embodiments described herein.

Moreover, various other embodiments described herein can provide a computer system. The computer system may comprise one or more processors, one or more memory devices, one or more input/output devices including one or more user terminals, and a computer program product that runs on the processors and associates data volume attribute values with entities and selectively merges entities in a common table in response to the data volume attribute values, according to any of the embodiments described herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Various embodiments described herein can allow a database modeling computer system to associate a data volume attribute value with entities in an entity-relationship data model for the database. The data volume attribute values may then be used by a database creation system to selectively merge a plurality of entities into a common table, so as to allow, for example, reduced input/output operations when querying data related to different entities.

Various embodiments described herein may arise from a recognition that a traditional entity-relationship model includes entities with attributes, relationships and keys, but does not allow a database modeler to specify a data volume that is associated with an entity. When the data volume is small, acceptable query performance may be obtained. However, when a given entity has a massive data volume, it may be difficult to perform queries with acceptable performance. Specifically, in a database, querying of data related to different entities may use a "join" clause or other query form to query data from different tables. Execution of a join clause in the database may generate large numbers of input/output operations, and the performance may be very slow if some of the tables have a large volume of data. In an attempt to ameliorate this low performance, a data modeler may redesign the physical model manually, to account for different data volumes of different entities.

In sharp contrast, various embodiments described herein allow a data volume attribute value to be associated with entities during the database modeling phase, for example in response to input from a data modeler or other user. Thus, data modelers can edit the data volume as an attribute or property in a logical or conceptual entity-relationship data model. At the database creation phase, a physical model can be automatically created based on the data volume by selectively merging entities into a common table in response to the data volume attribute values. Accordingly, physical models may be built that can reduce input/output costs for queries across multiple database tables, and thereby allow improved query performance in a database management system.

Figure 1:
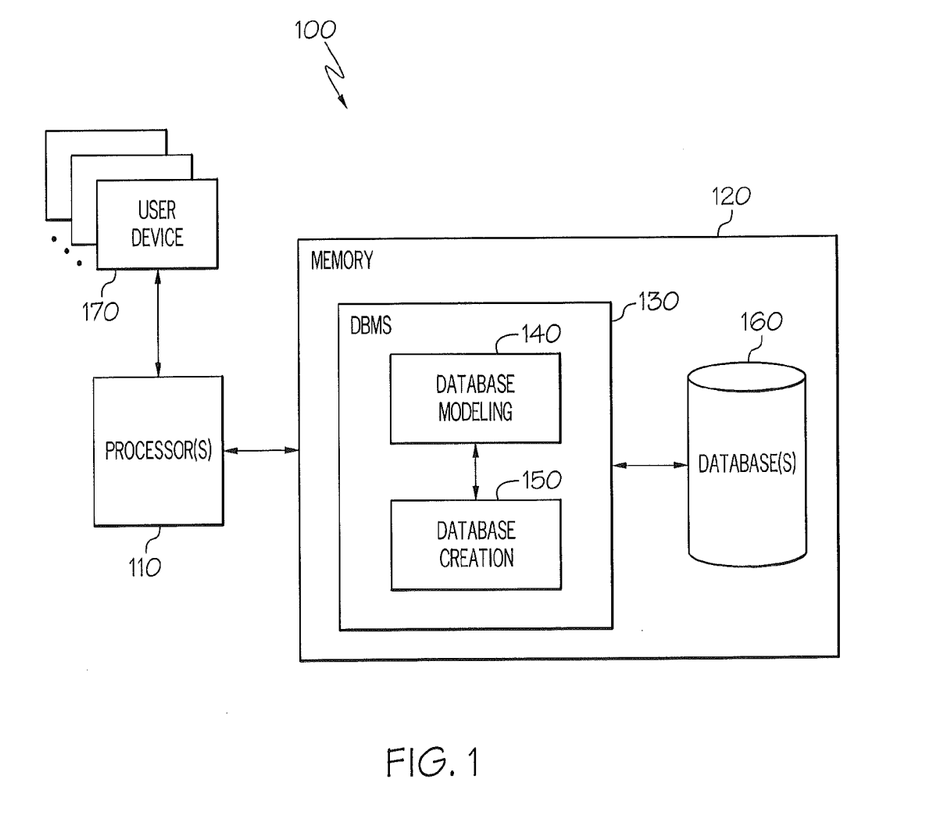
FIG. 1 is a block diagram of a computer system, method and/or computer program product according to various embodiments described herein.

FIG. 1 is a block diagram of a computer system, method and/or program product that can provide a DataBase Management System (DBMS) according to various embodiments described herein. Referring to FIG. 1, a computer system 100 may be embodied by one or more enterprise, application, personal, pervasive and/or embedded computer systems that are operable to receive, transmit, process and store data using any suitable combination of software, firmware and/or hardware, and that may be standalone or interconnected by any conventional public and/or private, real and/or virtual, wired and/or wireless network including all or a portion of the global communication network known as the Internet. One or more processors 110 communicate with one or more memories 120 that may be a combination of any one or more tangible computer-readable media. User input/output devices 170 may include output devices, such as a graphical display and/or loudspeaker, and input devices, such as a keyboard, touch screen, mouse and/or microphone. The processor 110, the memory 120 and the input/output devices 170 may communicate with one another over one or more buses and/or using other computer architectures. The user devices 170 may also be connected to the processor 110 directly or by any conventional public and/or private, real and/or virtual wired and/or wireless network including all or a portion of the global communication network known as the Internet.

A DBMS 130 may be stored in the memory 120. The DBMS 130 may be used to provide the definition, creation, querying, update and administration of one or more databases 160. The database(s) 160 may communicate with the DBMS 130 directly and/or may be connected to the DBMS 130 by any conventional public and/or private, real and/or virtual wired and/or wireless network including all or a portion of the global communication network known as the Internet. The database(s) 160 may be stored in a common memory 120 with the DBMS 130, as illustrated in FIG. 1, or they may be stored in different memories.

Still referring to FIG. 1, the DBMS 130 may include a database modeling computer system, method and/or program product 140, and a database creation computer system, method and/or program product 150. The DBMS may also include a query system, administration system and/or other functionality. The database modeling system 140 and the database creation system 150 may be provided by a single vendor as part of a DBMS or may be provided by different vendors.

Figure 2:
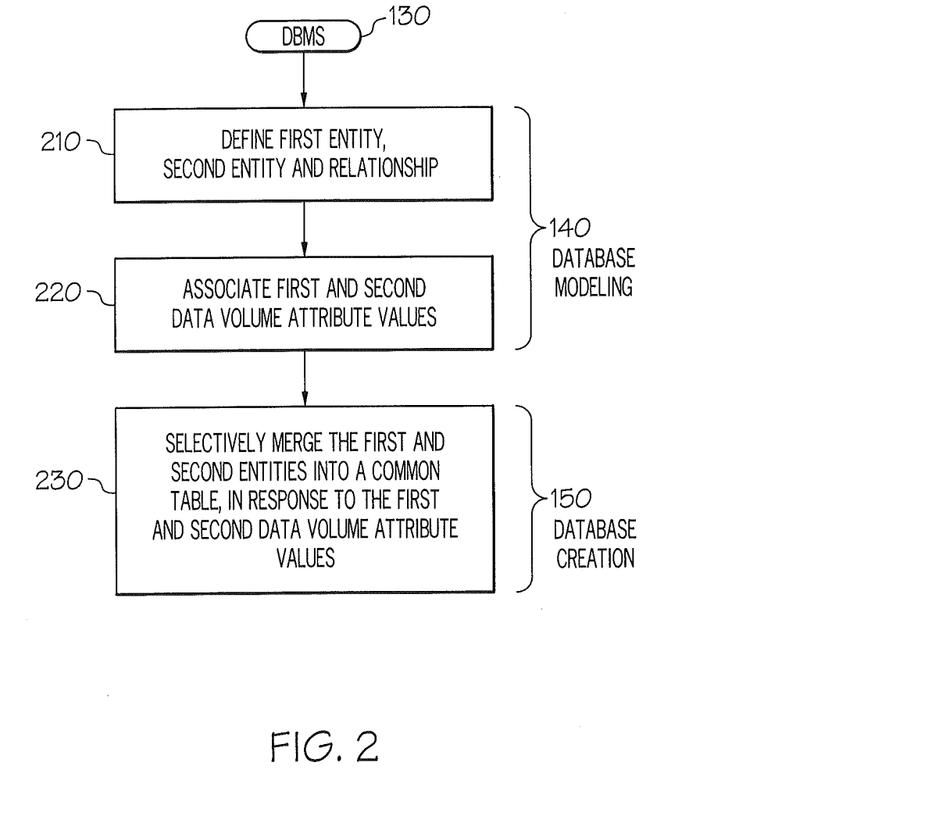
FIG. 2 is a flowchart of operations that may be performed by a database management system according to various embodiments described herein.

FIG. 2 is a flowchart of operations that may be performed by a DBMS, such as the DBMS 130 of FIG. 1, according to various embodiments described herein. Referring to FIG. 2, at Block 210, a database modeling computer system 140 defines a first entity, a second entity and the relationship therebetween, according to an entity-relationship model for a database, for example in response to user input at a user device 170. At Block 220, the database modeling computer system 140 associates a first data volume attribute value with the first entity and second a second data volume attribute value with the second entity, for example in response to user input of the first and second data volume attribute values at a user device 170. Finally, at Block 230, the first entity and the second entity are selectively merged into a common table by the database creation system 150, in response to the first and second data volume attribute values. Selectively merging may be automatically performed by the database creation computer system 150 in response to the data volume attribute values that were provided during database modeling. Various embodiments of selectively merging will be described below.

Figure 3:
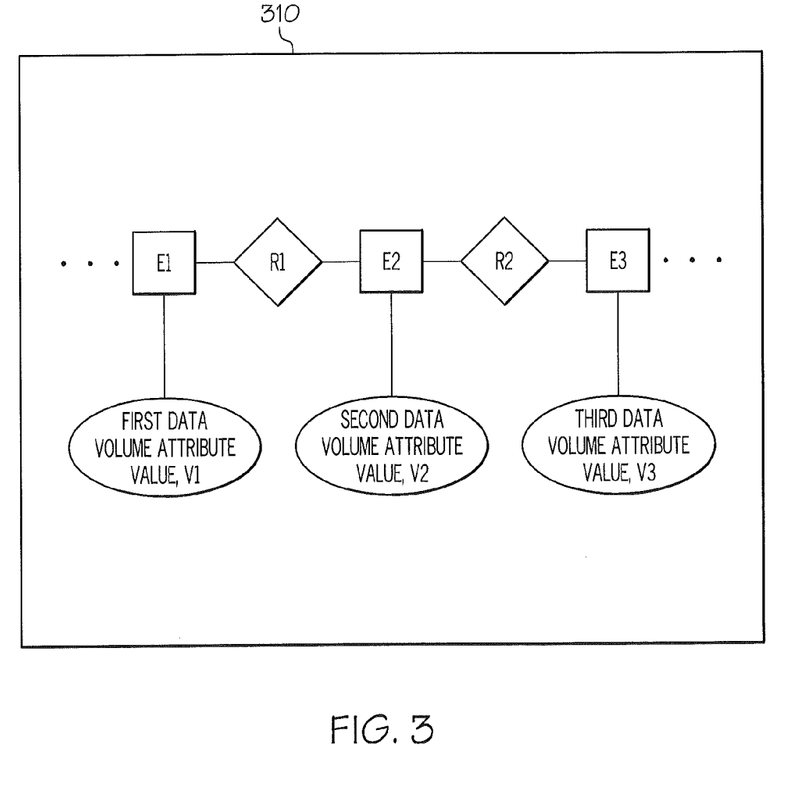
FIG. 3 is a screen shot of a user interface that may be used to perform database modeling according to various embodiments described herein.

FIG. 3 graphically illustrates the definition of entities and relationships, and the association of data volume attributes with entities, according to various embodiments described herein. These embodiments may correspond to the operations described at Blocks 210 and 220, and may be performed by a data modeling system 140. More specifically, FIG. 3 illustrates a display 310 of a user device 170 that may be displayed by a database modeling system 140. As illustrated in FIG. 3, a first entity E1, a second entity E2 and a third entity E3 are defined. A first relationship R1 between entities E1 and E2, and a second relationship R2 between the second and third entities E2 and E3 are also defined. It will be understood that as part of data modeling of a real world database, large numbers of entities and relationships may be defined according to an entity-relationship data model for the database. The above described operations may correspond to the operation of defining, by a database modeling computer system, a first entity, a second entity and a relationship therebetween according to an entity-relationship data model for a database, as was illustrated in Block 210.

Still referring to FIG. 3, a first data volume attribute value V1 may be associated with the first entity E1. A second data volume attribute value V2 may be associated with the second entity E2, and a third data volume attribute value V3 may be associated with the third entity E3. The data volume attribute value may specify an expected size of the data for a given entity based on, for example, user input at a user device 170. As shown in FIG. 3, a respective data volume attribute value V is associated with a respective entity E. It will be understood that not every entity need have a data volume attribute value in some embodiments. Moreover, in other embodiments, absent user selection, a default data volume attribute value, such as a small data volume attribute value, may be associated with the entity.

Having defined the entities, relationships and associated data volume attribute values, a database creation system 150 can then selectively merge the entities into a common table in response to the associated data volume attribute values. Various embodiments of selectively merging 230 will now be described in connection with FIG. 4.

Figure 4:
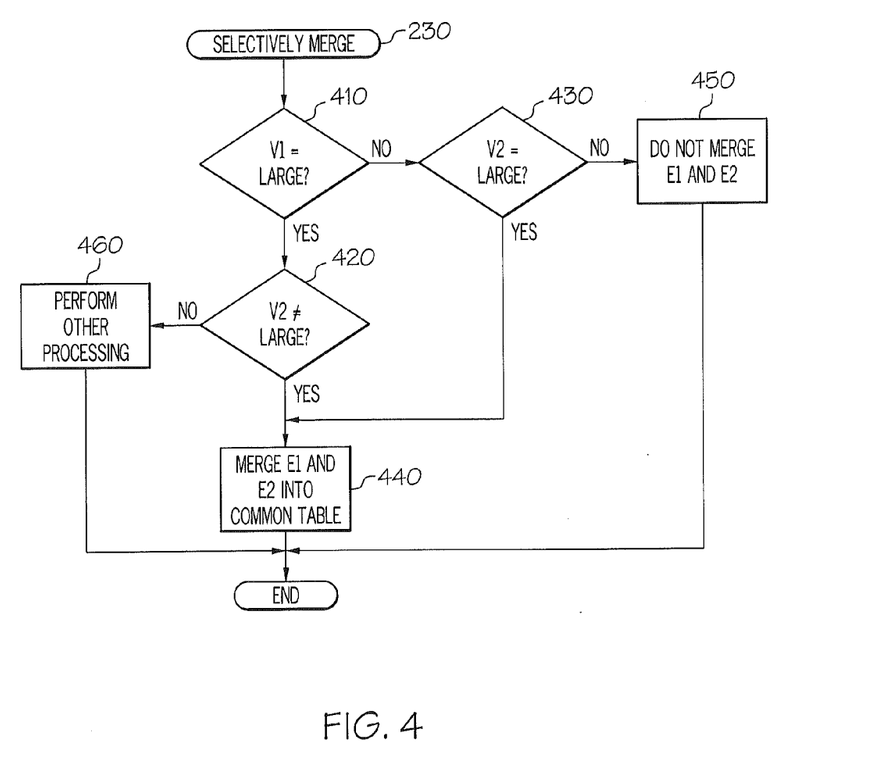
FIG. 4 is a flowchart of operations that may be performed to selectively merge entities according to various embodiments described herein.

Referring to FIG. 4, at Block 410, a test is made as to whether the first data volume attribute V1 for entity E1 is large. If "YES", a test is made at Block 420 as to whether the second data volume attribute value V2 for entity E2 is not large. If so, then at Block 440, entities E1 and E2 are merged into a common table. Thus, Blocks 410, 420 and 440 provide an embodiment of merging the first and second entities into the common table if the first data volume attribute value indicates a large data volume and the second data volume attribute value does not indicate the large data volume, according to various embodiments described herein.

Still referring to FIG. 4, if at Block 410 the first data volume attribute value V1 does not indicate a large volume, but at Block 420 the second data volume attribute V2 indicates a large volume, then, again, at Block 440, the first and second entities are merged into a common table. Thus, Blocks 410, 430 and 440 provide another embodiment of merging the first and second entities into the common table if the first data volume attribute value indicates a large data volume and the second data volume attribute value does not indicate the large data volume, according to various embodiments described herein.

Still referring to FIG. 4, if Block 410 does not indicate a large value for V1 (the "NO" of Block 410) and Block 430 also does not indicate a large value for V2 (the "NO" of Block 430), then at Block 450, entities E1 and E2 are not merged. Accordingly, Blocks 410, 430 and 450 provide embodiments of storing the first and second entities in separate tables if neither of the first and second data volume attribute values indicates a large data volume, according to various embodiments described herein. Finally, if at Block 410 V1 is indicated to be large (the "YES" of Block 410) and at Block 420 V2 is also indicated to be large (the "NO" of Block 420), then other processing may be performed at Block 460. For example, in some embodiments, the first and second entities may be stored in separate tables if both the first and second data volume attribute values indicate a large data volume. However, a new table may also be created for frequently queried data from the first and second entities.

For example, assume a table E_1(COL_1, COL_2) and a table E_2(COL_3, COL_4). If the frequent query is for "E_1.COL_2 join E_2.COL_3" and the tables E_1 and E_2 are very large, then the model can be designed as E_1 (COL_1), E_2(COL_4), E_3(COL_2, COL_3), where E_3 is the new table for the frequent query and E_1, E_2 can have reference to E_3. This example may apply to the scenario of a frequent query, but not for frequent insert/delete operations. In other embodiments, the first and second entities may be stored in separate tables, as was described at Block 450, without creating a new table for frequently queried data from the first and second entities.

Figure 5:
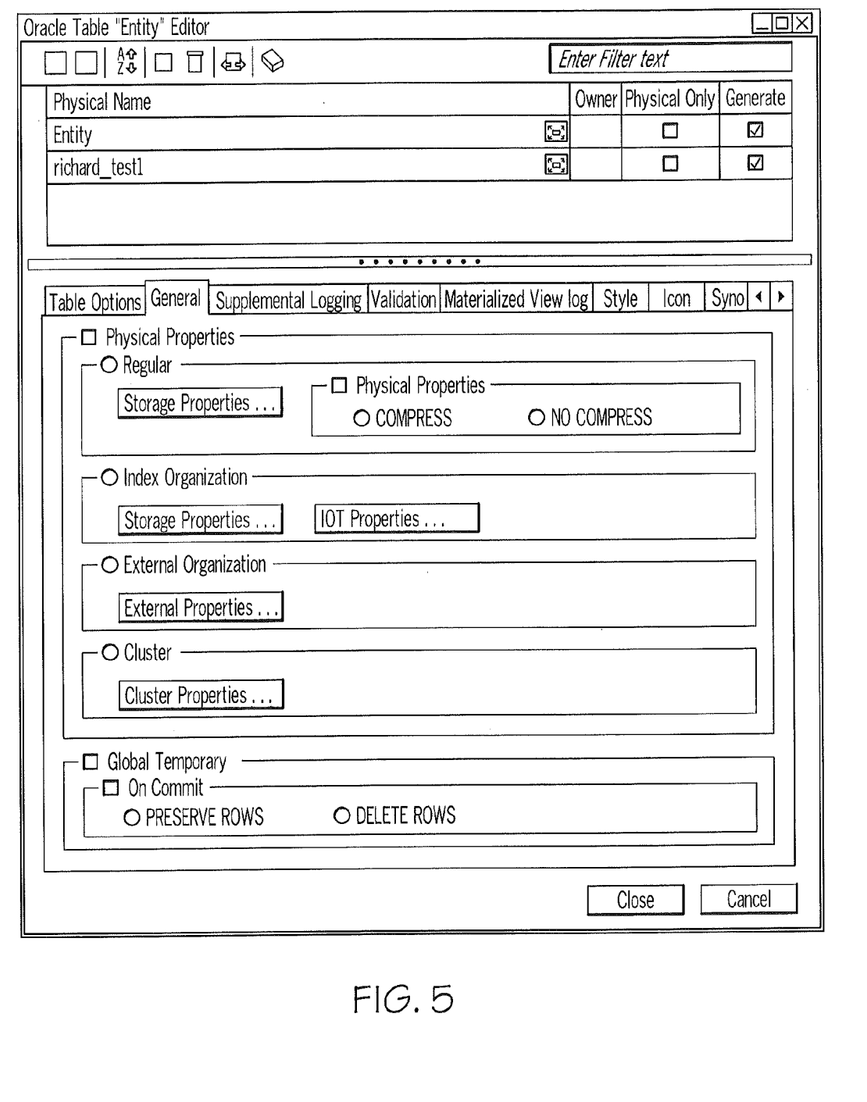
FIG. 5 is a screen shot of a user interface that may be used to define data volume options according to various embodiments described herein.

FIG. 5 is a screen shot of a user interface that may be used to define data volume attribute values for entities according to various embodiments described herein. This user interface may be displayed on a display of a user device 170 that provides an entity editor for an Oracle DBMS. Under the general operations shown, various physical properties or global temporary properties are defined. Any of the checkboxes or buttons illustrated in FIG. 5 may provide an option for associating a data volume attribute value with a given entity. Various user interfaces for various other DBMSs may be modified to allow user input of data volume attribute values, according to any of the embodiments described herein.

Figure 6A:
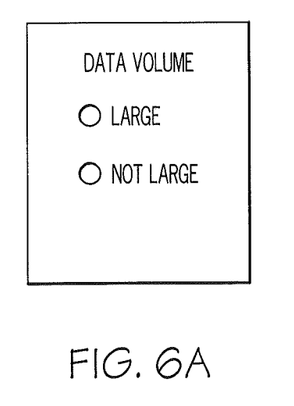
FIGS. 6A and 6B illustrate user interfaces that may be used to define data volume options according to various other embodiments described herein.

Data volume attribute values may be specified in various ways, according to various embodiments described herein. For example, as illustrated in FIG. 6A, the data volume attribute may be specified as a flag, the setting of which indicates a large data volume. Moreover, a default value of "Not Large" may be provided, if no value is selected. Accordingly, FIG. 6A illustrates embodiments wherein the data volume attribute is a flag, the setting of which indicates a large data volume. These embodiments may be applied to the selectively merging operations of FIG. 4 by merging the first and second entities into the common table (Block 440) if the first data volume attribute flag is set (a "YES" at Block 410), and the second data volume attribute flag is not set (a "YES" at Block 420).

Figure 6B:
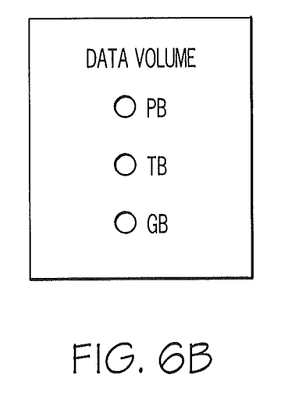

FIG. 6B illustrates a user interface that may be used to associate data volume attribute values with entities according to other embodiments described herein. In FIG. 6B, rather than a flag, data volume may be specified in terms of size, by specifying a data volume on the order of gigabytes (GB=1000 megabytes), terabytes (TB=1000 gigabytes) or pentabytes (PB=1000 terabytes) that the data is expected to occupy when stored in a memory device. Thus, as shown, in FIG. 6B, the data volume attribute may comprise a selection from a plurality of different data volumes. In some embodiments, the data volumes differ from one another by at least an order of magnitude and, as illustrated in FIG. 6B, by about three orders of magnitude. Operations of FIG. 4 may be provided using embodiments of FIG. 6B, by merging the first and second entities into the common table (Block 440) if the first data volume attribute value corresponds to a larger data volume (Block 410) than the second data volume attribute value (Block 420). In other embodiments, selectively merging may also take into account the absolute data volume (PB, TB or GB) of a given entity, in addition to the relative difference in data volumes among entities having a relationship therebetween.

Yet other techniques may be used to specify data volume. For example, a number of rows may be specified. Other techniques of providing a rough estimate of expected data volume may be used. In any of the embodiments described herein, the data volume attribute values may be stored in a key-value format. Moreover, although embodiments of FIGS. 6A and 6B used radio buttons for input, other techniques may be used. For example, a combo box may be used to allow a user to input a specific data volume, based, for example, on the user's business scenario.

It will also be understood that various embodiments described above have only described selective merging based on data volume attributes between two entities having a relationship therebetween. However, other embodiments may apply selective merging to three or more entities having relationships therebetween. For example, referring back to FIG. 3, the defining of Block 210 may further comprise defining, by the database modeling computer system 140, a third entity E3 and a relationship R2 between the second and third entities E2 and E3, according to the entity-relationship data model for the database. Moreover, the associating of Block 220 may further comprise associating a third data volume attribute value V3 with the third entity. Finally, the selectively merging of Block 230 may further comprise selectively merging by the database creation system, the first entity E1, the second entity E2 and the third entity E3 into a common table, in response to the first, second and third data volume attribute values V1, V2 and V3, respectively. In one example, selective merging of the three entities may take place when the first entity E1 has a large data volume attribute value V1 associated therewith, and both the second and third entities E2 and E3 have a small second and third data volume attribute values V2 and V3, respectively, associated therewith.

Figure 7:
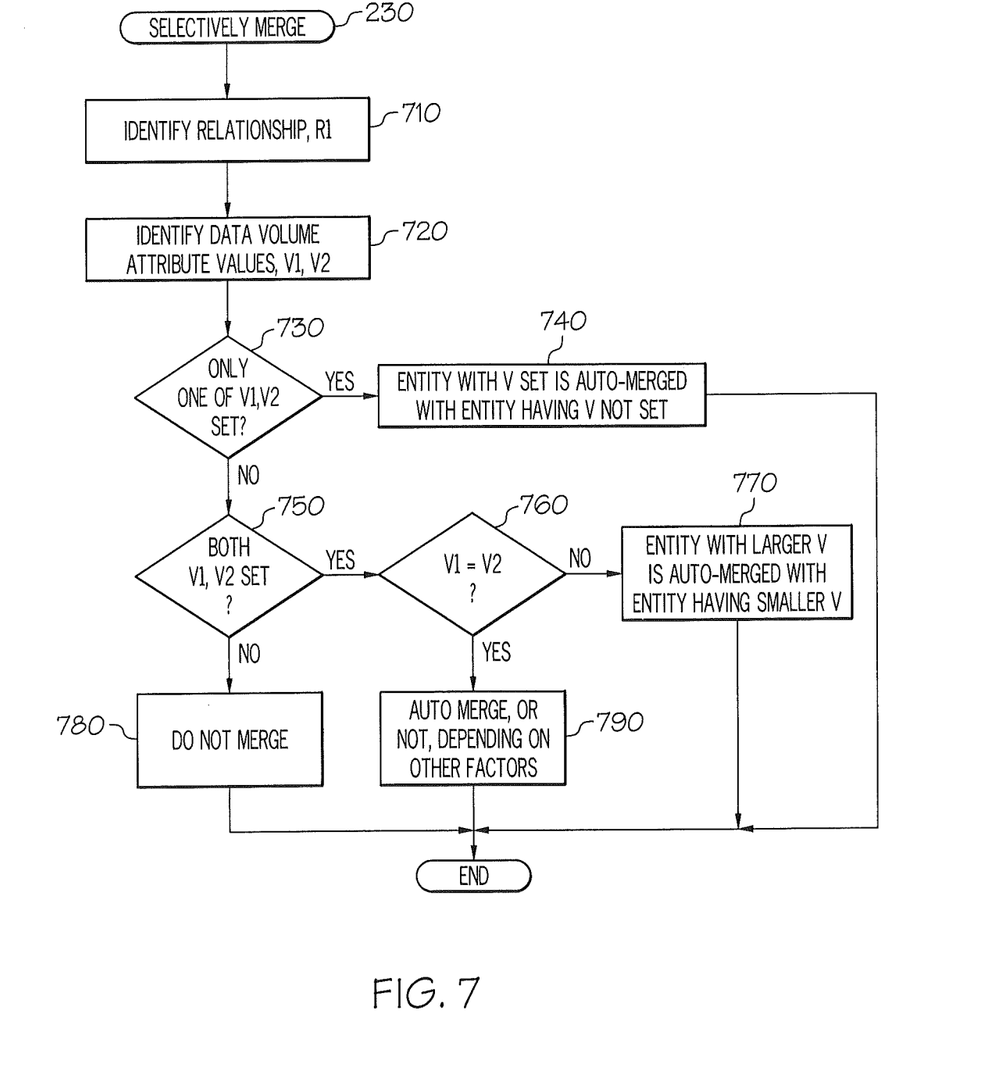
FIG. 7 is a flowchart of operations that may be performed to selectively merge entities according to various other embodiments described herein.

FIG. 7 is a flowchart of operations that may be performed to selectively merge the first entity and the second entity into a common table in response to the first and second data volume attribute values, according to various other embodiments described herein. Referring to FIG. 7, at Block 710, a relationship R1 is identified and, at Block 720, the data volume attribute values V1 and V2 that are associated with the entities E1 and E2 are identified. At Block 730, a test is made as to whether only one of V1 and V2 is set, to indicate that only one of V1 or V2 is expected to be large. If "YES", then at Block 740, the entity with the data volume attribute V that is set is auto-merged with the entity having the data volume attribute value that is not set.

Referring again to Block 730, if "NO", a test is made at Block 750 as to whether both V1 and V2 are set. If "YES", at Block 760, a determination is made as to whether V1=V2. More specifically, if a data volume is set for both V1 and V2, the data volume values may be compared, for example if they are specified according to FIG. 6B (GB, TB, PB), and the larger one is merged with the smaller one. Thus, at Block 770, the entity with the larger V is merged with the entity having the smaller V. In contrast, at Block 760, if the data volume attribute values are the same, then at Block 790, other processing may be performed to, for example, auto-merge or not, depending on other factors, such as other options that are defined for the entities or relationship. Finally, returning to Block 750, if both V1 and V2 are not set, then conventional database creation is performed by maintaining the entities separate, i.e., by not merging the entities.

For example, these factors may be dependent on the query. In a specific example, consider two tables E_1(COL_1, COL_2) and E_2(COL_1, COL_2) as very large tables. If the query is "select * from E_1 inner join E_2 on E_1.COL_1=E_2.COL_1", then the table E_2 can be merged to E_1. However, if the query has no join operation, they are not merged.

Additional discussion of various embodiments described herein will now be provided. Specifically, a large impact on database query performance may occur when data is selected in different tables with a join clause. For example, when the entity-relationship data model has created three different tables for E1, E2 and E3, and a query is performed to query data from the three tables, a Structured Query Language (SQL) statement may be executed by joining E1, E2 and E3. Unfortunately, join clause execution of the database may create very high I/O cost, so the performance may be very slow or the query may even not be accepted if some of the tables have a large data volume. Heretofore, it does not appear to have been possible to indicate expected data volume of the various entities during database modeling. Without these tags, the database creation system will create three different tables in the database, and the above described performance impact may take place. During database creation, senior or highly experienced modelers or database administrators may be able to redesign the schema in the database to account for the data volumes, but this redesign at database creation may be sporadic and resource intensive, as it may need to rely on experienced modelers or administrators.

In sharp contrast, various embodiments described herein can add an attribute or tag representing data volume to the entity-relationship model, so that the database creation application can automatically make sense of the design mapping to the database schemas. For example, in the example above, if E1 has a data volume tag, meaning it has massive data estimated, the database creation application can merge the tables for E2 and E3 into E1, to create a comprehensive table, for example Table E4, which includes all of the attributes of E1, E2 and E3. Then, when a user wishes to query data from E1, E2 and E3, the query can be executed on the new, comprehensive Table E4, so that join I/O costs can be reduced or eliminated. Accordingly, the data volume attributes can allow the database creation system to automatically selectively merge entities. Moreover, database administrators and modelers can have a deeper sense of the entity-relationship model, and can improve them to create schemas in the database more appropriately based on expected data volume, even if automatic selective merging is not used.

In a specific commercial example, in an Oracle database, users can partition data to different storage volumes for a table, and query the data from a specific partition. This partitioning of data in different storage volumes is often used to improve the data query performance. However, at the database modeling level, when a schema is created in the database and a conceptual or physical model is created, there is no knowledge of expected data volumes. Thus, the database creation may only be based on a data model designer's experience and knowledge as to how the data might be used in the future, and to create the database with this in mind. For example, if a designer has already created two tables in the entity-relationship model, E1 (with attributes A11 and A12) and E2 (with attribute A21), and a relationship R1 between them, the physical model will automatically provide two separate tables for E1 and E2. However, if the E1 data will be very large in a commercial environment, it may be difficult to query data via a join clause for E1 and E2 (for example, "select * from E1 inner join E2 on E1.Attribute=E2.Attribute").

If there are no data volume options for either entities, two tables are created in the database, and a primary key and a foreign key is created in the two tables presenting the relationship. In contrast, if Table E1 indicates a large data volume, a primary key and foreign key is not created in the two tables, so as to avoid a query by join clause. Instead, various embodiments described herein can merge Table E2 into E1, so that there will only be one table created in the database, with all attributes of E1 and E2. Thus, Table E1 can have attributes A11, A12 and A21.

Accordingly, as was described above, various embodiments described herein can allow a database modeling computer system to associate a data volume attribute value with entities in an entity-relationship data model for the database. The data volume attributes may then be used by a database creation system to selectively merge multiple entities into a common table, so as to allow for example, reduced input/output operations when querying data from different entities.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
defining, by a database modeling computer system, a first entity, a second entity and a relationship therebetween according to an entity-relationship data model for a database; and
associating, by the database modeling computer system, a first data volume attribute value with the first entity and a second data volume attribute value with the second entity,
wherein the first and second data volume attribute values provide indications of a size of data that is associated with the first and second entities, respectively.

2. A method according to claim 1 further comprising:
selectively merging, by a database creation system, the first entity and the second entity into a common table, in response to the first and second data volume attribute values.

3. A method according to claim 2 wherein the selectively merging comprises:
merging the first and second entities into the common table if the first data volume attribute value indicates a large data volume and the second data volume attribute value does not indicate the large data volume.

4. A method according to claim 3 wherein the data volume attribute value is a flag, the setting of which indicates a large data volume, and wherein the merging comprises:
merging the first and second entities into the common table if the first data volume attribute value flag is set and the second data volume attribute value flag is not set.

5. A method according to claim 3 wherein the data volume attribute value is a selection from a plurality of different data volumes, and wherein the merging comprises:
merging the first and second entities into the common table if the first data volume attribute value corresponds to a larger data volume than the second data volume attribute value.

6. A method according to claim 5 wherein the plurality of different data volumes differ from one another by at least an order of magnitude.

7. A method according to claim 2 wherein the selectively merging further comprises:
storing the first and second entities in separate tables if neither of the first and second data volume attribute values indicates a large data volume.

8. A method according to claim 2 wherein the selectively merging further comprises:
storing the first and second entities in separate tables if both the first and second data volume attribute values indicate a large data volume.

9. A method according to claim 8 further comprising:
creating a new table for frequently queried data from the first and second entities.

10. A method according to claim 2:
wherein the defining comprises defining, by the database modeling computer system, a third entity and a relationship between the second and third entities according to the entity-relationship data model for the database;
wherein the associating comprises associating, by the database modeling computer system, a third data volume attribute value with the third entity;
wherein the third data volume attribute value provides an indication of a size of data that is associated with the third entity; and
wherein the selectively merging comprises selectively merging, by the database creation system, the first entity, the second entity and the third entity into a common table, in response to the first, second and third data volume attribute values.

11. A computer program comprising:
a tangible computer readable storage medium comprising computer readable program code embodied in the medium that when executed by at least one processor of a computer system causes the computer system to perform operations comprising:
defining, by a database modeling computer system, a first entity, a second entity and a relationship therebetween according to an entity-relationship data model for a database; and
associating, by the database modeling computer system, a first data volume attribute value with the first entity and a second data volume attribute value with the second entity,
wherein the first and second data volume attribute values provide indications of a size of data that is associated with the first and second entities, respectively.

12. A computer program according to claim 11 wherein the operations further comprise:
selectively merging, by a database creation system, the first entity and the second entity into a common table, in response to the first and second data volume attribute values.

13. A computer program according to claim 12 wherein the selectively merging comprises:
merging the first and second entities into the common table if the first data volume attribute value indicates a large data volume and the second data volume attribute value does not indicate the large data volume.

14. A computer program according to claim 13 wherein the data volume attribute value is a flag, the setting of which indicates a large data volume, and wherein the merging comprises:
merging the first and second entities into the common table if the first data volume attribute value flag is set and the second data volume attribute value flag is not set.

15. A computer program according to claim 13 wherein the data volume attribute value is a selection from a plurality of different data volumes, and wherein the merging comprises:
merging the first and second entities into the common table if the first data volume attribute value corresponds to a larger data volume than the second data volume attribute value.

16. A computer program according to claim 15 wherein the plurality of different data volumes differ from one another by at least an order of magnitude.

17. A computer program according to claim 12 wherein the selectively merging further comprises:
storing the first and second entities in separate tables if neither of the first and second data volume attribute values indicates a large data volume.

18. A computer program according to claim 12 wherein the selectively merging further comprises:
storing the first and second entities in separate tables if both the first and second data volume attribute values indicate a large data volume.

19. A computer program according to claim 18 wherein the operations further comprise:
creating a new table for frequently queried data from the first and second entities.

20. A computer program according to claim 12:
wherein the defining comprises defining, by the database modeling computer system, a third entity and a relationship between the second and third entities according to the entity-relationship data model for the database;
wherein the associating comprises associating, by the database modeling computer system, a third data volume attribute value with the third entity;
wherein the third data volume attribute value provides an indication of a size of data that is associated with the third entity; and
wherein the selectively merging comprises selectively merging, by the database creation system, the first entity, the second entity and the third entity into a common table, in response to the first, second and third data volume attribute values.

21. A computer system comprising:
a processor; and
a database modeling computer system that runs on the processor, the database modeling computer system configured to perform operations comprising:
defining a first entity, a second entity and a relationship therebetween according to an entity-relationship data model for a database; and
associating a first data volume attribute value with the first entity and a second data volume attribute value with the second entity,
wherein the first and second data volume attribute values provide indications of a size of data that is associated with the first and second entities, respectively.

22. A computer system according to claim 21 further comprising a database creation system that runs on the processor, the database creation system configured to perform operations comprising:
selectively merging the first entity and the second entity into a common table, in response to the first and second data volume attribute values.

23. A computer system according to claim 22 wherein the selectively merging comprises:
merging the first and second entities into the common table if the first data volume attribute value indicates a large data volume and the second data volume attribute value does not indicate the large data volume.

24. A computer system according to claim 23 wherein the data volume attribute value is a flag, the setting of which indicates a large data volume, and wherein the merging comprises:
merging the first and second entities into the common table if the first data volume attribute value flag is set and the second data volume attribute value flag is not set.

25. A computer system according to claim 23 wherein the data volume attribute value is a selection from a plurality of different data volumes, and wherein the merging comprises:
merging the first and second entities into the common table if the first data volume attribute value corresponds to a larger data volume than the second data volume, attribute value.

26. A computer system according to claim 25 wherein the plurality of different data volumes differ from one another by at least an order of magnitude.

27. A computer system according to claim 22 wherein the selectively merging further comprises:
storing the first and second entities in separate tables if neither of the first and second data volume attribute values indicates a large data volume.

28. A computer system according to claim 22 wherein the selectively merging further comprises:
storing the first and second entities in separate tables if both the first and second data volume attribute values indicate a large data volume.

29. A computer system according to claim 28 wherein the operations further comprise:

creating a new table for frequently queried data from the first and second entities.

30. A computer system according to claim 22:

wherein the defining comprises defining a third entity and a relationship between the second and third entities according to the entity-relationship data model for the database;

wherein the associating comprises associating a third data volume attribute value with the third entity;

wherein the third data volume attribute value provides an indication of a size of data that is associated with the third entity; and wherein the selectively merging comprises selectively merging the first entity, the second entity and the third entity into a common table, in response to the first, second and third data volume attribute values.

\* \* \* \* \*